(12) United States Patent
Schoenhuber et al.

(10) Patent No.: US 9,106,169 B2
(45) Date of Patent: Aug. 11, 2015

(54) CONTROLLER STRUCTURE FOR MULTIPLE MECHANICALLY COUPLED DRIVE UNITS

(75) Inventors: Josef Schoenhuber, Nussdorf/Aiging (DE); Frieder Kohler, Lauter (DE); Stefan Maier, Chieming (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 467 days.

(21) Appl. No.: 13/132,802

(22) PCT Filed: Oct. 20, 2009

(86) PCT No.: PCT/EP2009/063731
§ 371 (c)(1),
(2), (4) Date: Aug. 15, 2011

(87) PCT Pub. No.: WO2010/063512
PCT Pub. Date: Jun. 10, 2010

(65) Prior Publication Data
US 2011/0301763 A1    Dec. 8, 2011

(30) Foreign Application Priority Data

Dec. 4, 2008  (DE) .......................... 10 2008 044 341

(51) Int. Cl.
*G05B 13/00*  (2006.01)
*H02P 5/50*  (2006.01)
*B23Q 5/10*  (2006.01)
(Continued)

(52) U.S. Cl.
CPC .. *H02P 5/50* (2013.01); *B23Q 5/10* (2013.01); *G05B 19/195* (2013.01); *G05B 19/416* (2013.01); *H02P 5/69* (2013.01);
(Continued)

(58) Field of Classification Search
CPC ......................................................... G05B 19/42
USPC ................................. 700/275; 318/34; 701/19
See application file for complete search history.

(56) References Cited

U.S. PATENT DOCUMENTS 5,748,465 A * 5/1998 Kaneko ............................ 700/3
6,445,147 B1 * 9/2002 Saitoh et al. ..................... 318/34
(Continued)

FOREIGN PATENT DOCUMENTS

DE    44 09 823    1/1995
DE    195 27 199    1/1997
(Continued)

OTHER PUBLICATIONS

International Search Report, issued in corresponding International Application No. PCT/EP2009/063731.

*Primary Examiner* — Robert Fennema
*Assistant Examiner* — Anthony Whittington
(74) *Attorney, Agent, or Firm* — Kenyon & Kenyon LLP

(57) ABSTRACT

A controller structure for more than two drive units coupled mechanically to a movable element includes a position measuring device for determining an actual position of the movable element and a position controller for calculating a setpoint speed from a setpoint position and the actual position, the position measuring device and the position controller jointly serving all drive units. Each drive unit, however, has a speed controller of its own. The drive units are configured either as master or as slave, individual drive units also being able to assume both functions. A torque-master-slave controller ensures a compensation of the torques between the drive units.

9 Claims, 3 Drawing Sheets

(51) Int. Cl.
  *G05B 19/19* (2006.01)
  *G05B 19/416* (2006.01)
  *H02P 5/69* (2006.01)

(52) U.S. Cl.
  CPC ............... *G05B2219/41264* (2013.01); *G05B 2219/42186* (2013.01); *G05B 2219/49252* (2013.01)

(56) References Cited

U.S. PATENT DOCUMENTS

| | | | | |
|---|---|---|---|---|
| 2002/0198648 | A1* | 12/2002 | Gilbreth et al. | 701/100 |
| 2003/0014985 | A1* | 1/2003 | Dresens et al. | 62/149 |
| 2003/0015873 | A1* | 1/2003 | Khalizadeh et al. | 290/7 |
| 2003/0169003 | A1* | 9/2003 | Cao et al. | 318/432 |
| 2003/0222615 | A1* | 12/2003 | Aono et al. | 318/625 |
| 2005/0073279 | A1* | 4/2005 | Fenley | 318/717 |
| 2008/0033690 | A1* | 2/2008 | Grupp | 702/152 |
| 2008/0077285 | A1* | 3/2008 | Kumar et al. | 701/19 |
| 2008/0176530 | A1* | 7/2008 | Kuhn et al. | 455/337 |
| 2011/0077779 | A1* | 3/2011 | Fuller et al. | 700/276 |

FOREIGN PATENT DOCUMENTS

| | | |
|---|---|---|
| DE | 196 16 855 | 1/1997 |
| DE | 100 51 638 | 7/2001 |
| EP | 0 704 962 | 4/1996 |
| EP | 1 742 128 | 1/2007 |

* cited by examiner

CONTROLLER STRUCTURE FOR MULTIPLE MECHANICALLY COUPLED DRIVE UNITS

FIELD OF THE INVENTION

The present invention relates to a controller structure for multiple mechanically coupled drive units. Such assemblages exist when for example a heavy machine table is to be moved in one direction using multiple drives. These drive units must then be controlled such that the load is distributed uniformly over all drive units without the occurrence of inadmissible tensions between the drives.

BACKGROUND INFORMATION

European Patent No. 0 704 962 describes a controller structure, by which a plurality of drives may be operated in a synchronized manner. The controller structure uses one common position and rotational speed controller for all cooperating drive units. This controller structure has the disadvantage that asymmetrical interferences regarding the torque can be corrected only symmetrically since there exists only one rotational speed controller.

SUMMARY

Example embodiments of the present invention provide a controller structure for multiple mechanically coupled drive units, which is configurable as flexibly as possible, and which may thus be easily adapted to various applications. For this purpose, a modular arrangement is advantageous, in which individual drive units and their directly associated controller structures may be interconnected in a simple manner to form a drive assemblage.

A controller structure is provided for more than two drive units coupled mechanically to a movable element. The controller structure has a position measuring device for determining an actual position of the movable element and a position controller for calculating a setpoint speed from a setpoint position and the actual position, the position measuring device and the position controller jointly serving all drive units. Each drive unit, however, has a speed controller of its own.

The controller structure is suitable for applications, in which more than two drive units are provided for advancing a movable element in one direction. In other words, this concerns machines, in which a movable axis is driven by more than two drives simultaneously.

In this instance, the current position of the movable element is detected by a single position measuring device and is supplied as the actual position to the controller structure, which compares it to a setpoint position and which, in the event of deviations, corrects the actual position to the setpoint position by suitably controlling all drive units.

For this purpose, the controller structure has a common position controller for all drive units, which determines a setpoint speed, which is specified for the individual drives, from the deviation between the actual position and the setpoint position.

Each drive unit has its own speed controller, which receives the setpoint speed of the common position controller and the actual speed and from this determines a setpoint current. This setpoint current is converted in a current controller into control signals for the actual motor.

Further advantages as well as details of example embodiments of the present invention are described further in the following description with reference to the figures.

DETAILED DESCRIPTION

Figure 1:
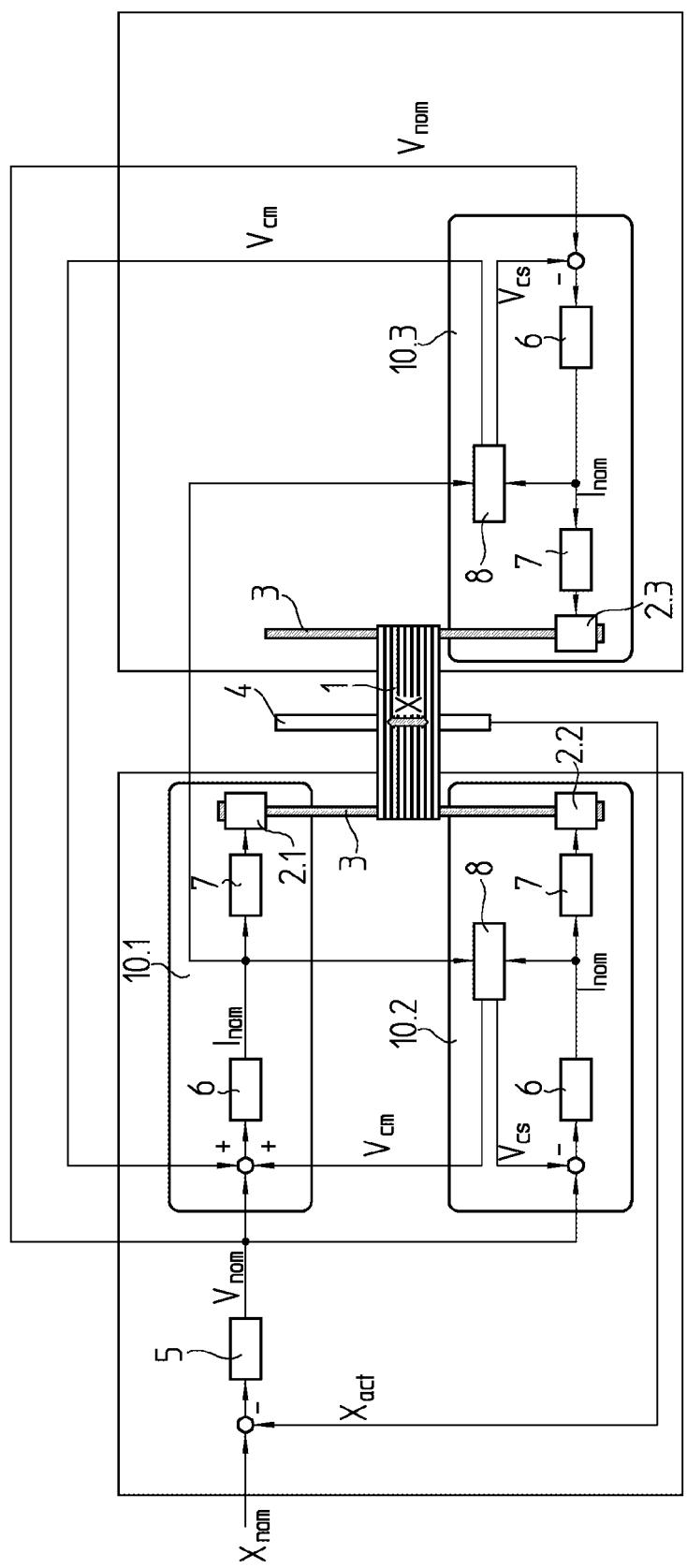
FIG. 1 illustrates a controller structure for three mechanically coupled drive units.

FIG. 1 shows a movable element 1 or more precisely a table 1, which is movable in a direction X using a linear axis. For this purpose, table 1 is driven by two spindles 3, which are situated parallel to direction X. One of the two spindles 3 is driven by two motors 2.1 and 2.2, and the other spindle by a single motor 2.3. These motors are components of drive units 10.1, 10.2 and 10.3. Such a configuration may be practical if the mass to be moved is disposed unevenly.

Since these drive units are constructed very similarly, and respectively include one speed controller 6, one current controller 7 and one motor 2 for example, reference symbols followed by an index are used below only if reference is made to a component of a specific drive unit, that is, e.g. for the motor 2.2 of drive unit 10.2. Otherwise, reference symbols are used without index, that is, e.g. for motors 2 of drive units 10.

The current position of table 1 is detected by a single position measuring device 4, the position value of which is used as the actual position Xact for controlling in all drive units 10. For this purpose, the actual position Xact is subtracted from a setpoint position Xnom and is supplied to a position controller 5, which generates in a conventional manner a setpoint speed Vnom valid for all drive units 10.

The setpoint speed Vnom is supplied to each drive unit 10, and is fed to a speed controller 6 existing in each drive unit 10. Previously, the current actual speed Vact, which may be generated for example by derivation of the actual position, is subtracted from setpoint speed Vnom. This subtraction is conventional and is not represented in the figures so as to be able to show the relevant details hereof more clearly. Speed controller 6 may also be referred to as a rotational speed controller since the rotational speed of motors 2 is connected to the speed of table 1 via the mechanical configuration.

Each rotational speed controller 6 produces a setpoint current Inom in a conventional manner, which as usual is supplied to a current controller 7 existing in each drive unit 10. Here too, the subtraction with an actual current is conventional and not shown in detail. Current controllers 7 produce setpoint values for the voltages of the individual motor phases in order to drive motors 2 such that table 1 is finally moved into its setpoint position Xnom specified from outside.

Now, in order to ensure that table 1 is driven uniformly and does not get jammed, drive unit 10.1 is arranged as the master, while drive units 10.2 and 10.3 are arranged as slaves to this master 10.1.

This means that drive units 10.2 and 10.3 respectively have one torque-master-slave controller 8, abbreviated in the following as MMS controller 8. MMS controllers 8 are thus associated with the slaves, while the master (that is, drive unit 10.1) has no MMS controller 8.

The precise structure of an MMS controller 8 is explained in more detail below with reference to FIG. 3. Initially, only the basic operating principle will be explained. MMS controller 8 of a slave receives as input values the setpoint currents Inom of its slave and of the latter's master. This setpoint current Inom is connected to the torque of the respective motor via the respective motor constant of respective motor 2. From this, MMS controller 8 respectively calculates one correction value Vcm, Vcs for the setpoint speed of the master and the slave, which are applied to the respective setpoint speeds with different signs, signs being based merely on conventions. Practically this means that MMS controller 8 is able for example to accelerate the master somewhat and to decelerate the slave somewhat so as to synchronize both drive units with respect to their torque.

Since in the present example drive units 10.2 and 10.3 work as slaves for master 10.1, the master receives both from MMS controller 8.2 as well as from MMS controller 8.3 respectively one correction value Vcm for the setpoint speed Vnom. As one can see, the number of individual slaves may be increased in a simple manner. For each additional slave, in this controller topology, the master receives a correction value Vcm for the setpoint speed.

According to this exemplary embodiment, the controller structure is thus constructed by merely two different modules or types of drive units, that is, by one master and multiple slaves. Master and slaves receive a common setpoint speed Vnom from a common position controller 5, which is supplied with the actual position Xact by a single common position measuring device 4. Master and slaves then themselves respectively include the additional elements of a cascaded control loop, that is, in this case speed controller 6 and current controller 7. In addition, each slave has one MMS controller 8 assigned to it, which ensures the coordination between each master-slave pair as described, in that it produces correction values Vcm and Vcs for the setpoint speed Vnom of master and slave such that varying torques a equalized.

Figure 2:
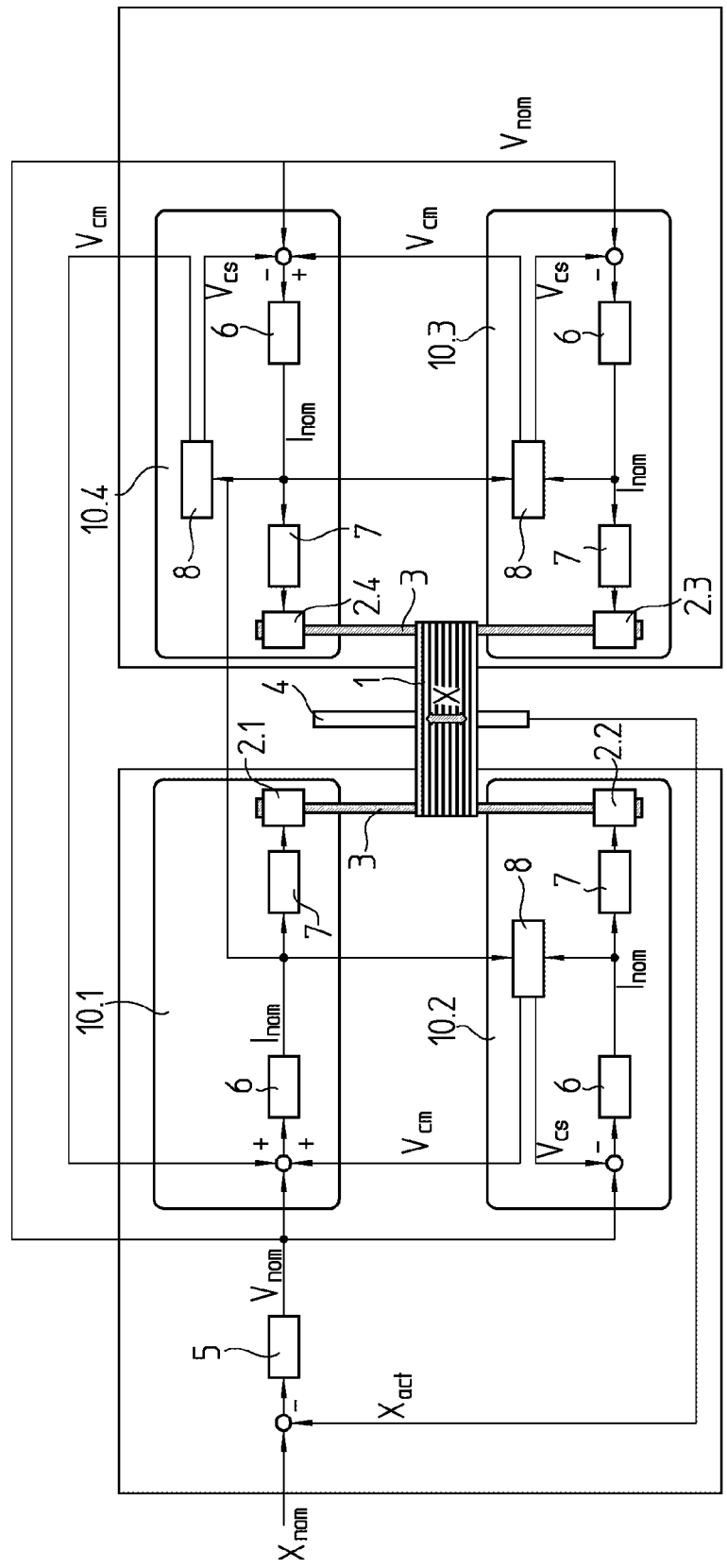
FIG. 2 illustrates a controller structure for four mechanically coupled drive units.

FIG. 2 shows another exemplary embodiment having a controller structure supplemented by another module or by another configuration option for a drive unit 10. An assemblage of one master and one or multiple slaves as in the first exemplary embodiment is itself able to act outwardly as a slave with respect to a higher-order master.

FIG. 2 shows a system that is very similar to FIG. 1. The individual components that have already been explained are not explained again; rather the differences are to be shown.

According to this exemplary embodiment, four drive units 10 are provided for moving table 1. Newly added drive unit 10.4, however, is not configured as an additional slave to master 10.1—which would correspond to a configuration according to the type of the first exemplary embodiment. Rather, drive unit 10.4 functions as a master for drive unit 10.3. MMS controller 8.3 of drive unit 10.3 is thus connected accordingly between drive units 10.3 and 10.4. Based on setpoint currents Inom of these two drive units, it calculates correction values Vcm and Vcs for the setpoint speed Vnom of drive units 10.4 and 10.3, respectively.

Drive units 10.3 and 10.4 thus work together as master and slave. This assemblage of master and slave, however, additionally acts as a slave with respect to drive unit 10.1 configured as a master. For this reason, drive unit 10.4 has an MMS controller 8.4, even though it functions as a master with respect to drive unit 10.3. Based on setpoint currents Inom of drive units 10.1 and 10.4, MMS controller 8.4 calculates correction values Vcm and Vcs for the setpoint speed Vnom of drive units 10.1 and 10.4, respectively.

Drive unit 10.1 is thus a master for slave 10.2 as in the first exemplary embodiment. In addition, drive unit 10.1 is also a master with respect to the master-slave assemblage of drive units 10.4 and 10.3.

Drive unit 10.4 is both a master for drive unit 10.3 as well as a slave for drive unit 10.1.

Another configuration option for drive units 10 has thus been added to the first exemplary embodiment of FIG. 1, namely, the assemblage of a drive unit 10.4 as the master and a drive unit 10.3 as a slave. This assemblage could include additional drive units 10 configured as slave to master 10.4. Drive unit 10.4 of this assemblage additionally acts as a slave to higher-order master 10.1. For this reason, in spite of its role as a master with respect to slave 10.3, it has an MMS controller 8.

In general, one can state that only drive unit 10.1, which functions as the higher-order master, has no MMS controller 8. All other drive units 10.2, 10.3, 10.4 have an MMS controller 8 since they are either simple slaves to a master or are masters in an assemblage with one or multiple slaves and at the same time slaves to a higher-order master.

Since in the end there can only be one higher-order master, exactly one drive unit 10.1 has no MMS controller 8, while all other drive units 10.2, 10.3, 10.4 have an MMS controller 8.

Figure 3:
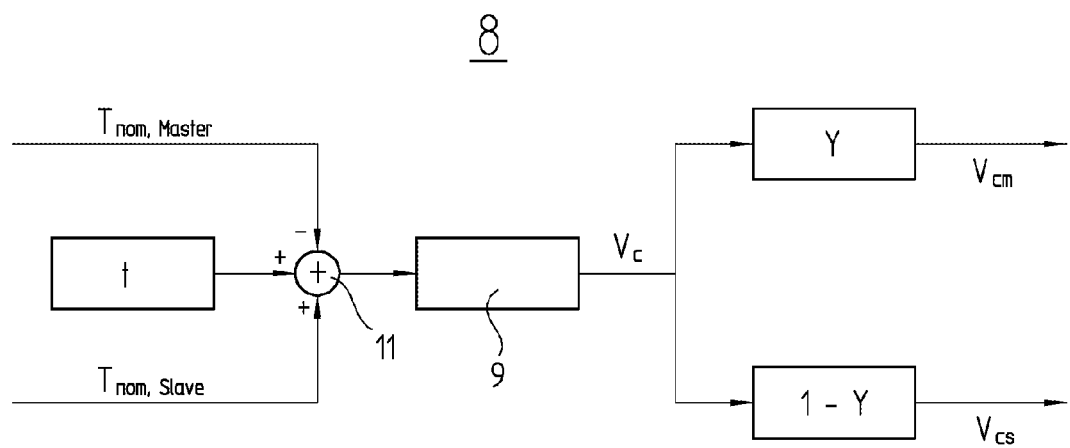
FIG. 3 illustrates the controller structures for multiple mechanically coupled drive units.

FIG. 3 shows such an MMS controller 8 in detail. The setpoint torques Tnom,Master and Tnom,Slave formed from the setpoint currents of master and slave are subtracted from each other at addition point 11 and thus form a measure for the mutual tension of master and slave. Via a parameter t, which is additionally applied to the difference, it is also possible to define a setpoint pre-tension in order to pre-tension master and slave mechanically against each other. Thus two gear wheels, for example, which jointly drive a gear rack, may be tensioned against each other in order to operate the mechanism without tooth face change and thus without play.

The value formed at the addition point 11 is converted in a torque controller 9 into a speed correction value Vc. This correction value is added to the setpoint speed of the master and is subtracted from the setpoint speed of the slave, as shown in the preceding figures.

It is additionally possible to divide the speed correction value asymmetrically. For this purpose, the correction value is multiplied by a parameter y between 0 and 2 in order to form correction value Vcm for the master and multiplied by (2−y) in order to determine the correction value Vcs for the slave. For y=1, the correction value is divided equally such that Vcm=Vcs=Vc. An asymmetrical division may be practical if e.g. position measuring device 4 is not situated as shown in FIGS. 1 and 2 centrally between the drives.

It is not absolutely necessary for MMS controllers 8 to operate based on the setpoint currents Inom of the respective drive units 10. The actual currents are also a suitable measure for the respective torque since in practice setpoint and actual current will not deviate from each other greatly over a longer period of time.

The invention claimed is:

1. A controller structure for a plurality of drive units mechanically coupled to a movable element, comprising:
   a single position measuring device configured to determine an actual position of the movable element; and
   a position controller configured to calculate a setpoint speed valid for all drive units from a setpoint position and the actual position;
   wherein the position measuring device and the position controller are configured to jointly serve all of the drive units, each drive unit including a speed controller;
   wherein one drive unit is configured as a higher-order master, and each drive units subordinated to the master is configured as a slave and includes an MMS controller configured to provide a speed correction value for the master and the slave; and wherein the plurality of drive units are mechanically coupled to the movable element and are configured to simultaneously advance the movable element in one direction.

2. The controller structure according to claim 1, wherein the MMS controller is configured to ascertain speed correction values for the master and the slave based on at least one of (a) setpoint currents and (b) actual currents, and therefore based on torques of the master and the slave.

3. The controller structure according to claim 1, wherein the MMS controller is configured to parameterize a mechanical setpoint pre-tension between the master and the slave.

4. The controller structure according to claim 1, wherein the speed correction values have different signs.

5. The controller structure according to claim 1, wherein the speed correction values have different absolute values in order to distribute a necessary speed correction asymmetrically between the master and the slave.

6. The controller structure according to claim 1, wherein at least one of the drive units is configured to function both as a master at least of one additional drive unit and as a slave of a higher-order master.

7. The controller structure according to claim 6, wherein the drive unit configured to function both as a master and a slave includes an MMS controller configured for calibration with the higher-order master.

8. The controller structure according to claim 1, wherein with the exception of the higher-order master, each drive unit has an MMS controller.

9. A system, comprising:
   a movable element;
   a plurality of drive units coupled to the movable element; and
   a controller structure including:
      a single position measuring device configured to determine an actual position of the movable element; and
      a position controller configured to calculate a setpoint speed valid for all drive units from a setpoint position and the actual position;
   wherein the position measuring device and the position controller are configured to jointly serve all of the drive units, each drive unit including a speed controller;
   wherein one drive unit is configured as a higher-order master, and each drive units subordinated to the master is configured as a slave and includes an MMS controller configured to provide a speed correction value for the master and the slave; and
   wherein the plurality of drive units are mechanically coupled to the movable element and are configured to simultaneously advance the movable element in one direction.

* * * * *